July 11, 1933.  L. H. VON OHLSEN ET AL  1,917,473
SYSTEM AND APPARATUS FOR REGULATION
Filed Dec. 10, 1930
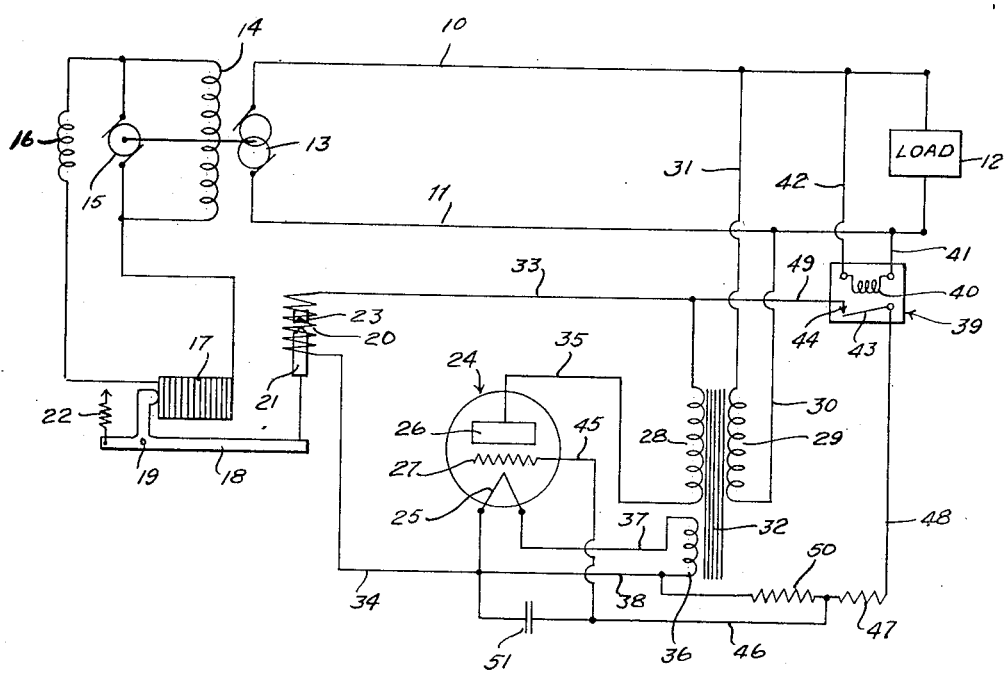
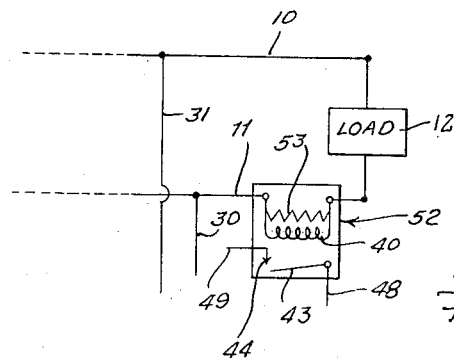

Patented July 11, 1933

1,917,473

UNITED STATES PATENT OFFICE

LOUIS H. VON OHLSEN AND FRANK W. GODSEY, JR., OF NEW HAVEN, CONNECTICUT, ASSIGNORS TO THE SAFETY CAR HEATING & LIGHTING COMPANY, A CORPORATION OF NEW JERSEY

SYSTEM AND APPARATUS FOR REGULATION

Application filed December 10, 1930. Serial No. 501,309.

This invention relates to electric regulation and more particularly to an apparatus and system for the regulation of alternating current circuits.

One of the objects of this invention is to provide an inexpensive and thoroughly practical system and apparatus for regulating the output of a source of alternating current or for regulating a function of the alternating current energy in a work or translation circuit. Another object is to provide a system and apparatus of the above-mentioned character that will be simple and efficient and dependable in action. Another object is to provide a system and apparatus of the above-mentioned character in which the manifold advantages of a compressible carbon pile variable resistance may be fully realized. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which are shown several of various possible embodiments of our invention:

Figure 1 shows diagrammatically a preferred form of regulating system and apparatus for regulating the voltage of an alternating current circuit, and Figure 2 is a similar but fragmentary diagrammatic showing of a system and apparatus for the regulation of the current in an alternating current circuit.

Similar reference characters refer to similar parts throughout the several views of the drawing.

Referring now to Figure 1 of the drawing, we have shown a main alternating current circuit 10—11 supplying alternating current to a load 12 of any suitable form, the main line 10—11 being supplied with energy from a suitable source of alternating current illustratively taking the form of an alternator 13 having an exciting field 14 energized by an exciter 15. The exciter 15 may take any suitable form and may, for example, be a shunt wound direct current generator having, hence, a shunt field winding 16. The excitation supplied by the exciter 15 to the field winding of the alternator 13 may be controlled in any suitable manner, preferably, however, by controlling the excitation of the exciter generator 15; hence, there is included in the circuit of the shunt field 16 a carbon pile 17 the pressure upon which, and hence the resistance of which, may be varied, for example, by means of a bell crank lever 18, pivoted as at 19, and having a solenoid winding 20 acting, through the core 21, in a direction to relieve the pressure on the carbon pile 17, and having a spring 22, preferably adjustable, for opposing the action of the winding or coil 20.

The coil 20 and the magnetic circuit to which it is related are designed and constructed, as is diagrammatically indicated in the drawing, so that the winding 20, when energized by a certain value of uni-directional current, holds the core 21 in whatever position it has been moved within its range of movement. For this purpose the core 21 may be tapered at its upper end and may coact with a fixed core piece 23 provided with a correspondingly tapered recess with which the upper tapered end of the core 21 coacts, in a manner now known to those skilled in the art. To achieve this action most efficiently, the current energizing the winding 20 is preferably a uni-directional current and relatively free from pulsations of low frequency. Coil 20, nevertheless, is energized by a function of the alternating current energy supplied to the load or work circuit 12, but, in accordance with certain features of my invention, in a manner to prevent the relatively low frequency, such as 60 or 25 cycles usually employed in commercial power circuits, from having a detrimental effect upon the action of the coil and core and upon the movable parts controlled or operated by the latter.

Coil 20 is energized by uni-directional current derived by rectification of alternating current derived from the alternator 13 and such rectification, together with other features of action and control to be hereinafter more clearly described, is achieved preferably by way of a rectifier 24 preferably taking the form of a three-element thermionic type of vacuum tube; the device 24 therefore has a filament electrode 25, a plate electrode 26 and, in accordance with certain other features of our invention, it also has a control grid or control element 27 for controlling the uni-directionally conductive electronic conduction path extending between the filament cathode 25 and the plate anode 26. This uni-directionally conductive path is included in circuit with the coil 20 and with a winding 28, of suitable voltage, of a transformer whose other winding 29 is connected, by conductors 30 and 31, across the main line conductors 10—11. Windings 28 and 29 are, of course, associated with a suitable magnetic circuit diagrammatically indicated at 32.

The energizing circuit of coil 20 will thus be seen to extend from one terminal of transformer winding 28, conductor 33, winding 20, conductor 34, filament cathode 25 of the device 24, plate anode 26, and thence by way of conductor 35 to the other side of the transformer winding 28; the latter supplies a suitable voltage in this circuit for achieving adequate energization of coil 20, the ratio of transformation of the transformer 28—29 being suited to this voltage and to the voltage of the main line 10—11.

Filament cathode 25 is energized by a winding 36 suitably related to the magnetic circuit 32 of transformer 28—29 and winding 36, through conductors 37 and 38, supplies a suitable heating current to the cathode 25 at a suitable voltage, the latter being preferably relatively low.

At this point it might be noted that variations in the voltage across the main line 10—11 are effective, through the transformer 28—29—36, to cause like variations in (1) the voltage in the plate circuit and hence in the energizing circuit of coil 20 and (2) variations in the current that heats the cathode 25. These latter variations act cumulatively to vary the energization of winding 20 and may, if desired, take a material part in the regulation of the alternator or the voltage of its output. However, in accordance with certain other features of my invention, we cause such variations in the voltage across the main line 10—11 to affect the control element or grid 27.

The action of control element or grid 27 we preferably place under the control of a contact-making voltmeter generally indicated at 39; voltmeter 39 has its actuating coil 40 connected across the circuit 10—11 which is to be regulated, by means of conductors 41 and 42, and under the control of the coil 40 is a movable contact 43 adapted to coact with a fixed contact 44. More specifically, the parts are so constructed or adjusted or related to each other that the contact 43 separates from contact 44 when the intended voltage across the circuit 10—11 is departed from in a downward direction and is brought into contact with fixed contact 44 if the intended voltage begins to be exceeded.

The closure of contacts 43—44 is made effective to apply a positive potential to grid 27, thus to cause the latter to cause the current in the energizing circuit of regulating coil 20 to increase. This positive potential may be obtained in any suitable manner and as illustrative of a convenient manner of obtaining it, we arrange the grid 27 and contacts 43—44 in a circuit that leads to conductor 33 which joins the positive terminal of transformer winding 28 with the positive terminal of winding 20. More specifically, the closure of contacts 43—44 effects the closure of a circuit extending from grid 27, conductor 45, conductor 46, resistance 47, conductor 48, movable contact 43, fixed contact 44, and by way of conductor 49 to the positive conductor 33.

When contacts 43—44 are open grid 27 is, in effect, connected to the filament cathode 25 by conductor 45, conductor 46, resistance 50 and conductor 38. A suitable condenser 51 is shunted between the grid 27 and filament cathode 25.

Resistances 47 and 50 and the capacity of condenser 51 are proportioned so that the rise in voltage on the grid 27 is at the desired rate to give a correspondingly desired rate of increase of current in the plate circuit of the vacuum tube 24 and in which plate circuit is included the regulating coil 20.

Accordingly, when an increase in the voltage across conductors 10—11 takes place, not only is the voltage of transformer winding 28 and the filament-heating current correspondingly increased, but also the voltmeter 39 effects a closure of contacts 43—44, to cause a suitable rate of increase in positive potential to be effective upon control grid 27. This raising of the positive potential applied to grid 27 in effect increases the conductivity of the vacuum tube 24 and causes a greater current to flow in the plate circuit and hence through the regulating coil 20. This action may be utilized alone or it may and preferably does have contributed thereto the action of the increase in voltage of the plate 26 and the action of the increased heating of filament cathode 25 added thereto to cause an increase in the current through regulating coil 20.

The energization of coil 20 is thus increased so that the theretofore existing equilibrium between its own pull and that of spring 22 is disturbed and the pressure on carbon pile 17 is diminished. The resistance of carbon pile 17 is thus increased, the excitation supplied to the alternator 13 correspondingly diminished and the voltage across the circuit 10—11 diminished. As soon as the intended value of voltage across conductors 10—11 is over-reached in a diminishing direction, voltmeter 39 releases movable contact 43 and the latter action causes the removal of the theretofore applied positive potential from the control grid 27. The conductivity of the vacuum tube 24 is thus at once greatly diminished and there results also a diminution in the energizing current flowing through regulating coil 20. The spring 22 then becomes effective to start increasing the pressure on carbon pile 17 and this action in turn results in increasing the excitation supplied to the alternator 13 with resultant increase in the voltage across conductors 10—11, whence the above-described cycle of action is repeated. The rate at which this cycle of operations is repeated may depend upon various factors and due to the inherent relatively high rapidity of operation of the circuits controlling the energization of regulating coil 20, the cyclic repetition of the above-described sequence of operations is relatively high, with the result that a high degree of constancy of potential across conductors 10—11 may be dependably maintained.

In Figure 2 we have shown only fragmentarily so much of the circuit arrangement of Figure 1 as is necessary to achieve constancy of current in the circuit 10—11, as distinguished from constancy of voltage across the circuit 10—11. In Figure 2 we utilize an ammeter 52 connected directly in the circuit, as by insertion in conductor 11, of the circuit in which constancy of current is to be maintained. Ammeter 52 is provided with an actuating coil 40 shunted by a suitable shunt 53, coil 40 controlling the coaction of movable contact 43 with fixed contact 44 in response to departures from the desired value of current in the circuit 10—11 just as coil 40 of Figure 1 acted in response to departures from the desired value of voltage across conductors 10—11.

It will thus be seen that there has been provided in this invention a system and apparatus in which the various objects hereinabove set forth, together with many thoroughly practical advantages, are successfully achieved. It will be seen that the system and apparatus are well adapted to meet the conditions of hard practical use and that the manifold advantages of the carbon pile regulator, which advantages need not be gone into in detail here, are successfully achieved in the field of alternating current or voltage regulation. It might at this point be noted, however, that the arrangement of the carbon pile 17 to affect the excitation of the alternator 13 is merely illustrative of one of many possible arrangements of a carbon pile, controlled as above described, to affect the voltage or current in the circuit intended to be regulated.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

We claim:

1. In apparatus of the character described, in combination, a source of alternating current; a carbon pile for controlling a function of the output of said source, and means for controlling the pressure on said carbon pile, said means including an electronic conduction device having a cathode, an anode, and a control element, a coil for affecting the pressure on said carbon pile, means connecting said coil and two electrodes of said device to be energized by unidirectional current derived from said source, said control element operating to change the conductivity of said device in response to potential changes applied thereto, means responsive to changes in said function of the output of said source for making and breaking a circuit, and means responsive to the action of said last-mentioned means for changing the potential applied to said control element.

2. In apparatus of the character described, in combination, a source of alternating current, a carbon pile for controlling a function of the output of said source, and means for controlling the pressure on said carbon pile, said means including an electronic conduction device having a cathode, an anode, and a control element, a coil for affecting the pressure on said carbon pile, means connecting said coil and two electrodes of said device to be energized by uni-directional current derived from said source, said control element operating to change the conductivity of said device in response to potential changes applied thereto, a contactor adapted in one position to affect the potential of said control element to increase the conductivity of said device and in another position to affect the potential of said element in a direction to decrease the conductivity of said device, and means responsive to changes in said function of the output of said source for controlling said contactor.

3. In apparatus of the character described, in combination, a source of alternating current, a carbon pile for controlling a function of the output of said source, and means for controlling the pressure on said carbon pile, said means including an electronic conduction device having a cathode, an anode, and a control element, a coil for effecting the pressure on said carbon pile, means connecting said coil and two electrodes of said device to be energized by uni-directional current derived from said source, a contactor, an energizing circuit having included therein said contactor and said control element, and means responsive to changes in said function of the output of said source for controlling said contactor.

4. In apparatus of the character described, in combination, a source of alternating current, a carbon pile for controlling a function of the output of said source, and means for controlling the pressure on said carbon pile, said means including an electronic conduction device having a cathode, an anode, and a control element, a coil for affecting the pressure on said carbon pile, means connecting said coil and two electrodes of said device to be energized by uni-directional current derived from said source, a make-and-break device for affecting the action of said control element, and means responsive to said function of the output of said source for controlling said make-and-break device.

5. In apparatus of the character described, in combination, a source of alternating current, a carbon pile for controlling a function of the output of said source, and means for controlling the pressure on said carbon pile, said means including a uni-laterally conductive device operating by electronic conduction, a coil for affecting the pressure on said carbon pile and in circuit with said device, means including a switch for affecting the conductivity of said device, and means responsive to changes in said function of the output of said source for controlling said switch.

6. In apparatus of the character described, in combination, a source of alternating current, a carbon pile for controlling a function of the output of said source, and means for controlling the pressure on said carbon pile, said means including a uni-laterally conductive device operating by electronic conduction, a coil for affecting the pressure on said carbon pile and in circuit with said device, means including resistance means and controlling means for the latter for affecting the conductivity of said device, and means responsive to changes in said function of the output of said source for controlling said controlling means.

7. In apparatus of the character described, in combination, a source of alternating current, a carbon pile for controlling a function of the output of said source, and means for controlling the pressure on said carbon pile, said means including a coil for controlling the pressure on said carbon pile, a uni-laterally conductive device having an anode and a heated cathode connected in circuit with said source and with said coil to supply said coil with uni-directional current derived from said source, means for varying the heating of said heated cathode substantially in response to changes in said function of the output of said source, and means including a circuit-controlling device and means responsive to changes in the function of said output for varying the conductivity of said device.

8. In apparatus of the character described, in combination, a source of current, means including a regulating element and an operating coil therefor and a three-element device operating by electronic conduction for regulating a function of the output of said source, one of the elements of said device being a control element, a contactor for affecting said control element to vary the conductivity of said device, means relating said device and said coil so that variation in the conductivity of said device varies the energization of said operating coil, and means responsive to changes in said function of the output of said source for controlling said contactor.

9. In apparatus of the character described, in combination, a source of current, means including a regulating element and an operating coil therefor and a three-element device operating by electronic conduction for regulating a function of the output of said source, one of the elements of said device being a control element, resistance means and means for changing the latter for affecting said control element to change the conductivity of said device, means relating said device and said coil so that variation in the conductivity of said device varies the energization of said operating coil, and means responsive to changes in a function of the output of said source for controlling said last-mentioned means.

10. In apparatus of the character described, in combination, a source of current, a carbon pile for controlling a function of the output of said source, a coil for affecting said carbon pile, a device operating by electronic conduction in circuit with said coil, means including a contactor adapted in one position to increase the conductivity of said device and in another position to decrease the conductivity of said device, and means responsive to changes in said function of the output of said source for controlling said contactor.

11. In apparatus of the character described, in combination, a source of current, a carbon pile for controlling a function of the output of said source, a coil for affecting said carbon pile, a three-element device having a electronic conduction path between two of its elements under the control of the third element connected in circuit with said coil, means including movable means for affecting said control element to change the conductivity of said path in said device, and means responsive to changes in said function of the output of said source for controlling said movable means.

12. In apparatus of the character described, in combination, a source of current, a carbon pile for controlling a function of the output of said source, a coil for affecting said carbon pile, a three-element device having an electronic conduction path between two of its elements under the control of the third element connected in circuit with said coil, a contactor adapted in one position to affect said control element to increase the conductivity of said path and in another position to cause said control element to diminish the conductivity of said path, and means responsive to changes in said function of the output of said source for controlling said contactor.

13. In apparatus of the character described, in combination, a source of alternating current, a carbon pile for controlling a function of the output of said source, means including a thermionic device having anode, cathode and control electrodes for actuating said carbon pile, means including a potentiometer for biasing the control electrode of said thermionic device to render the device conductive, and means responsive to changes in said function of the output of said source for rendering operative said potentiometer.

14. In apparatus of the character described, in combination, a source of current, means including a variable resistance and a movable actuating element therefor for controlling a function of the output of said source, means including a thermionic device having anode, cathode and control electrodes for actuating said movable element, a resistance element connected between cathode and control electrodes, and means responsive to changes in said function of the output of said source for rendering effective said resistance element affecting said thermionic device.

15. In apparatus of the character described, in combination, a source of alternating current, means including a resistance element for controlling a function of the output of said source, means including a thermionic device having anode, cathode and control electrodes for actuating said first mentioned means, means responsive to changes in said function of said output for varying the conductivity of said device, and a second means actuated by changes in the function of said output for varying the conductivity of said device.

16. In apparatus of the character described, in combination, a source of alternating current, means including a resistance element for controlling the function of the output of said source, means including a thermionic device having anode, cathode and control electrodes for actuating said first mentioned means, means including a transformer connection between said source and said cathode electrode for controlling said actuating means, a potentiometer connection between anode and cathode having an intermediate section connected to said control electrode, and means responsive to changes in the function of said output for rendering effective said potentiometer connection.

17. In apparatus of the character described, in combination, a source of current, means including a thermionic device having anode, cathode and control electrodes, and a movable device and electro-responsive operating means therefor affected by said thermionic device, for regulating a function of the output of said source, means including a contactor for affecting said control electrode, thereby to affect said thermionic device and its action on said electro-responsive operating means, and means acting in response to changes in the function of the output of said source for controlling said contactor.

18. In apparatus of the character described, in combination, a source of current, means including a thermionic device having anode, cathode and control electrodes, and a movable device and electro-responsive operating means therefor affected by said thermioni device, for regulating a function of the output of said source, means including a potentiometer for affecting said control electrode, thereby to affect said thermionic device and its action on said electro-responsive operating means, switching means for affecting the relation of said potentiometer to said control electrode, and means responsive to changes in said function of the output of said source for controlling said switching means.

In testimony whereof, we have signed our names to this specification this 5th day of December, 1930.

FRANK W. GODSEY, Jr.
LOUIS H. VON OHLSEN.